United States Patent Office 3,432,650
Patented Mar. 11, 1969

3,432,650

SIGNAL MULTIPLIER PROVIDING AN OUTPUT SIGNAL SUBSTANTIALLY FREE OF COMPONENTS PROPORTIONAL TO THE INDIVIDUAL INPUT SIGNALS

Gordon Bruce Thompson, Ottawa, Ontario, Canada, assignor to Northern Electric Company Limited, Montreal, Quebec, Canada Filed Nov. 10, 1964, Ser. No. 410,121
U.S. Cl. 235—194 14 Claims
Int. Cl. G06g 7/16

ABSTRACT OF THE DISCLOSURE

One of the two input signals to be multiplied is applied in its positive and its negative form to the bases of a first and a second transistor, respectively. The emitters of both a third and a fourth transistor are connected to the collector of the first transistor, while their collectors are connected to the two ends of a load resistor across which the output signal is generated. Similarly, the emitters of both a fifth and a sixth transistor are connected to the collector of the second transistor, while the collector of the fifth transistor is connected to the collector of the third transistor and the collector of the sixth transistor to that of the fourth transistor. The second input signal is applied in its positive form to the bases of the third and the sixth transistors and in its negative form to the bases of the fourth and the fifth transistors. The emitters of both the first and the second transistors are connected to a centre tap of the load resistor. Biasing is applied to operate the first and the second transistors in their most linear operating range and the third to sixth transistors in their most exponential range.

This invention relates to a signal multiplier, commonly termed a modulator, and more particularly it relates to a linear signal multiplier capable of multiplying two electrical signals together (commonly A.C. signals) to obtain an output signal containing a component representative of the product of the two input signals and containing substantially no components representative of the two input signals themselves.

In the past, signal multipliers available for multiplying two A.C. input signals have been such that in their output appeared not only the product of the two input signals but also components representative of one or both of the input signals themselves. In order to eliminate these undesired components, tank or filter circuits had to be provided in the output in order to make possible an output signal that would be essentially a simple product of the two input signals. Design of suitable filters frequently presented difficulty, particularly when the input signals were of complex waveform, and the presence of the filters often imposed undesirable limitations on the performance of the circuit.

Accordingly, it is an object of the present invention to provide a signal multiplier for two input signals that will provide an output signal substantially free of components proportional to the individual input signals over the operating range of the signal multiplier. The input signals may be of the same frequency, or may be of different frequencies, and may be sinusoidal or nonsinusoidal, as desired.

Other objects and advantages of the invention will appear from the following disclosure, in which the circuits illustrated are described by way of example only, the broad scope of the invention being limited only by the appended claims.

Figure 1:
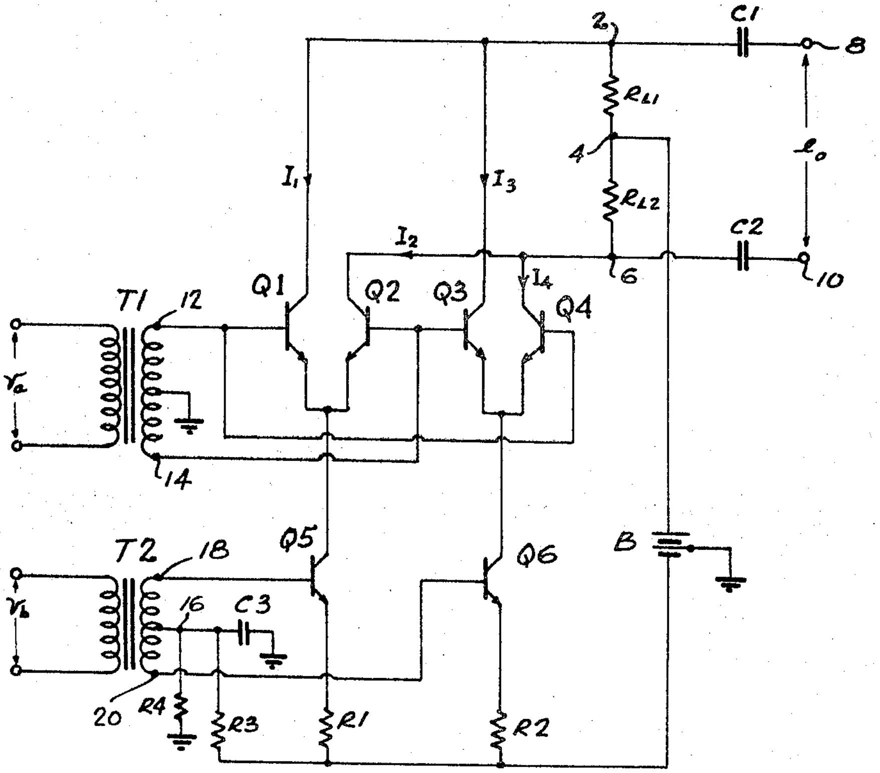
FIGURE 1 shows a first circuit according to the invention and employing transistors.

Referring now to FIGURE 1 there is shown a first circuit according to the invention. A set of four similar transistors Q1 to Q4 is provided, having substantially identical operating characteristics. (Indeed all four of these transistors may advantageously be manufactured on the same substrate to assist in achieving such operating characteristics.) Transistors Q1 and Q2 have their emitters connected together and to the collector of another transistor Q5, while transistors Q3 and Q4 have their emitters connected together and to the collector of another transistor Q6. The emitters of transistors Q5 and Q6 are connected through relatively high resistances R1 and R2, respectively, to the negative terminal of a voltage source shown here as a centre grounded battery B. Transistors Q5 and Q6 act essentially as current generators generating a current proportional to a signal applied to their bases, as will be explained later in more detail.

The collectors of transistors Q1 and Q3 are connected together and to one terminal 2 of a load resistor $R_{L1}$, the other terminal 4 of resistor $R_{L1}$ being connected to the positive terminal of battery B. The collectors of transistors Q2 and Q4 are similarly connected together and to one terminal 6 of another load resistor $R_{L2}$ of the same resistance as resistor $R_{L1}$, the other terminal of resistor $R_{L2}$ being connected to terminal 4 and hence to the positive terminal of battery B.

An output signal $e_0$ is taken from the circuit across the series connection of resistors $R_{L1}$ and $R_{L2}$, from output terminals 8 and 10, terminals 8 and 10 being connected through blocking capacitors C1 and C2 to resistor terminals 2 and 6 respectively.

A first input signal $v_a$ is applied to the primary winding of a transformer T1, signal $v_a$ being one of the signals to be multiplied. The secondary winding of transformer T1 (which may be assumed for purposes of explanation to have a one to one turns ratio) is centre grounded with one terminal 12 connected to the bases of transistors Q1 and Q4 and the other terminal 14 connected to the bases of transistors Q2 and Q3. The circuit parameters are so chosen that the bias potential (ground potential) applied (in the absence of any input signal $v_a$) to the bases of transistor Q1 to Q4 holds these transistors approximately in the middle of their most exponential operating range with each having an equal input impedance. The signal $v_a$ as applied to the bases of transistors Q1 and Q4 on the one hand, and to the bases of transistors Q2 and Q3 on the other hand, is balanced about this bias potential.

A second input signal $v_b$ for the circuit is applied to the primary winding of another transformer T2 (also assumed to have a one to one turns ratio), the secondary winding of transformer T2 having a centre tap 16 and end terminals 18 and 20. Terminals 18 and 20 are connected to the bases of transistors Q5 and Q6, respectively, while centre tap 16 is connected to a voltage divider biasing network consisting of resistor R3 connected to the negative terminal of source B and resistor R4 connected to ground. The bias potential at tap 16 is selected to hold transistors Q5 and Q6 approximately in the middle of their most linear operating range, and signal $v_b$ applied between the bases of transistors Q5 and Q6 is balanced about this bias potential. Capacitor C3 is a by pass element to hold tap 16 at A.C. ground potential.

The operation of the circuit of FIGURE 1 may be partially explained qualitatively as follows. Consider the situation when no signal $v_a$ is applied to terminals 12 and 14, but a signal $v_b$ is applied to terminals 18 and 20. Then, since transistors Q1 and Q2 are biased equally (both ground), they will share the collector current of transistor Q5 equally, the collector currents $I_1$ and $I_2$ of transistors Q1 and Q2 thus being equal. Since current $I_1$ flows upwardly in resistor $R_{L1}$ (as shown in FIGURE 1) and current $I_2$ flows downwardly in resistor $R_{L2}$, the voltages produced by these currents across resistors $R_{L2}$, the voltages produced by these currents across resistors $R_{L1}$ and $R_{L2}$ cancel and no output at terminals 8, 10 results. Similarly the voltages produced by the collector currents of transistors Q3 and Q4 cancel across the series connection of resistors $R_{L1}$ and $R_{L2}$.

Next consider the situation when signal $v_a$ is present but signal $v_b$ is absent, so that each of transistors Q5 and Q6 generates only a DC quiescent current I. With signal $v_a$ present the ratio of the input impedances of transistors Q1 and Q2 will vary as determined by signal $v_a$ and these transistors respectively will share the current I generated by transistor Q5 in the ratio of their respective input impedances. Transistors Q4 and Q3 respectively will share the current I generated by transistor Q6 in the same ratio. Assume for purposes of illustration that at a given instant signal $v_a$ is such that transistor Q1 conducts 70% of current I and transistor Q2 conducts 30% of this current. Similarly then, transistor Q3 conducts 30% of current I and transistor Q4 conducts 70%. Thus, currents $I_1+I_3$ flowing upwardly through resistor $R_{L1}$ are equal in sum to currents $I_2+I_4$ flowing downwardly through resistor $R_{L2}$, so again no output signal $e_o$ appears across the series connection of resistors $R_{L1}$ and $R_{L2}$.

Thus it may be seen that when either input signal is absent, there is no output signal, as should be the case for a linear multiplier.

Figure 3:
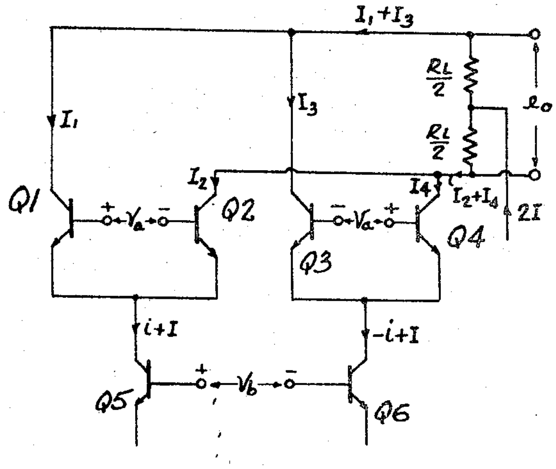
FIGURE 3 shows another partial equivalent circuit for the circuit of FIGURE 1.
Figure 2:
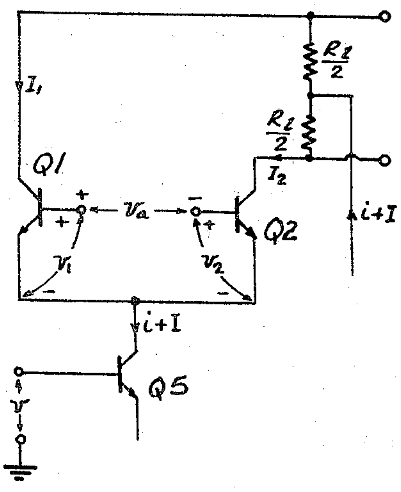
FIGURE 2 shows a partial equivalent circuit for the circuit of FIGURE 1.

For a better understanding of the operation of the FIGURE 1 circuit when both input signals $v_a$ and $v_b$ are present, further illustrative analysis is presented, with reference to the partial equivalent circuits of FIGURES 2 and 3. In this analysis, which is approximate only, it is assumed that the collector current in a transistor is dependent on the base-to-emitter voltage only, and not on the collector-to-base or collector-to-emitter voltages. It is assumed that the collector current $I_1$ of transistor Q1 is related to the base-to-emitter voltage $v_1$ by the following law:

$$I_1=I_s(e^{kv_1}-1) \tag{1}$$

where $I_s$ is the saturation current of the transistor and $k$ is a constant for purposes of this discussion.

For ease of manipulation Equation 1 may be rewritten as $$I_1'=I_s e^{kv_1} \tag{2}$$

where $$I_1'=I_1+I_s \tag{3}$$

Referring now to FIGURE 2 there is shown a partial equivalent circuit comprising the first pair of transistors Q1 and Q2 of the FIGURE 1 circuit, the resistance of each of the load resistors $R_{L1}$ and $R_{L2}$ being denoted by $R_L/2$. It is assumed that transistor Q5 connected to the emitters of transistors Q1 and Q2 is generating a quiescent DC current I, on which is superimposed an AC current $i$ as determined by a signal $v$ applied to the base of transistor Q5. This current $i+I$ is shared between transistors Q1 and Q2 in proportions determined by the signal $v_a$ applied to the bases of these transistors, transistor Q1 carrying current $I_1$ and transistor Q2 carrying current $I_2$, where $$I_1+I_2=i+I \tag{4}$$

Since from Equation 3, $I_1=I_1'-I_s=I_2'-I_s$, Equation 4 can be rewritten $$I_1'+I_2'=i+I+2I_s \tag{5}$$

In addition, from Equation 2, and since $v_1=v_a+v_2$ (from FIGURE 2), therefore $$I_1'=I_s e^{kv_1}=I_s e^{k(v_a+v_2)}$$

and $$I_2'=I_s e^{kv_2}$$

hence $$I_1'=I_2' e^{kv_a} \tag{6}$$

Substituting for $I_1'$ in Equation 5 the value given in Equation 6, we obtain $$I_2'(e^{kv_a}+1)=i+I+2I_s$$

so that $$I_2'=\frac{i+I+2I_s}{1+e^{kv_a}} \tag{7}$$

Substituting for $I_2'$ in Equation 5 the value given in Equation 7 we obtain $$I_1'=(i+I+2I_s)\frac{e^{kv_a}}{1+e^{kv_a}} \tag{8}$$

Now substituting in Equations 7 and 8 the original variables $I_1$ and $I_2$ (as defined by Equation 3) and separating the various components we can write $$I_1=i\frac{e^{kv_a}}{1+e^{kv_a}}+(I+2I_s)\frac{e^{kv_a}}{1+e^{kv_a}}-I_s \tag{9}$$

and $$I_2=i\frac{1}{1+e^{kv_a}}+(I+2I_s)\frac{1}{1+e^{kv_a}}-I_s \tag{10}$$

It may be noted that each of these currents contains a component which is a function of both inputs $i$ and $v_a$, a component which is a function of $v_a$ only, and a DC term. (It will be recalled that input current $i$ is dependent upon input signal $v$ applied to the base of transistor Q5.)

Reference is next made to FIGURE 3 which shows an equivalent circuit for the entire multiplier. The emitter currents $I_1$ and $I_2$ of transistors Q1 and Q2 add up to current $i+I$ as before. However transistors Q3 and Q4 are supplied with current from transistor Q6 which has a signal applied at its base of opposite polarity (with respect to the bias potential for transistors Q5 and Q6) to the signal applied at the base of transistor Q5. Assuming as previously mentioned that transistors Q5 and Q6 are operated in a linear range, transistor Q6 will therefore generate a current $-i+I$, and the emitter currents $I_3$ and $I_4$ of transistors Q3 and Q4 total $-i+I$ instead of $i+I$.

Therefore currents $I_1$ and $I_2$ in the FIGURE 3 circuit are as given by Equations 9 and 10, respectively, but currents $I_3$ and $I_4$ are given by $$I_3=-i\frac{1}{1+e^{kv_a}}+(1+2I_s)\frac{1}{1+e^{kv_a}}-I_s \tag{11}$$

$$I_4=-i\frac{e^{kv_a}}{1+e^{kv_a}}+(I+2I_s)\frac{e^{kv_a}}{1+e^{kv_a}}-I_s \tag{12}$$

Now the output signal $e_0$ is $$\begin{aligned} e_o&=(I_1+I_3)\frac{R_L}{2}-(I_2+I_4)\frac{R_L}{2} \\ &=\frac{R_L}{2}(I_1-I_2+I_3-I_4) \end{aligned} \tag{13}$$

Substituting into Equation 13 the values for currents $I_1$ to $I_4$, $$\begin{aligned} e_o&=iR_L\frac{e^{kv_a}-1}{e^{kv_a}+1} \\ &=iR_L \tanh\frac{kv_a}{2} \end{aligned} \tag{14}$$

which for $$\frac{kv_a}{2} \ll 1$$

$$= iR_L \frac{kv_a}{2} \qquad (15)$$

$$= kiv_a \qquad (15a)$$

which is a product of the two inputs $i$ and $v_a$, K being constant to $kR_L/2$. (Input current $i$ is, of course, linearly dependent upon signal $v_b$.)

*Approximate error analysis*

Peak distortion D may be defined as:

$$D = \frac{\text{Linear output} - \text{actual output}}{\text{Linear output}}$$

Now the distortion D could be calculated in terms of $kv_a$ but since $k$ is a relatively complex constant depending on several factors and is difficult to measure, distortion D will be calculated instead in terms of the current gain for the circuit, the current gain being relatively simple to measure.

The current gain $\alpha$ for the circuit may be defined as the ratio of the actual output voltage to the output voltage which the input current $i$ would produce in the load resistors $R_{L1}$ and $R_{L2}$ if the transistors Q2 and Q3 were not present. In other words $\alpha = e_0/iR_L$ and hence by equation 14, $$\alpha = \tanh \frac{kv_a}{2} \qquad (16)$$

From Equation 15 the linear output is $$iR_L \frac{kv_a}{2}$$

which can be written as $iR_L \tanh^{-1} \alpha$ by virtue of Equation 16.

The actual output is, from Equation 14, $$iR_L \tanh \frac{kv_a}{2}$$

which can be written as $iR_L\alpha$, from Equation 16.

Hence distortion $$D = \frac{\tanh^{-1} \alpha - \alpha}{\tanh^{-1} \alpha}$$

and using the expression $$\tanh^{-1} \alpha = \alpha + \frac{\alpha^3}{3} + \frac{\alpha^5}{5} + \ldots$$

$$D = \frac{\frac{\alpha^3}{3} + \frac{\alpha^5}{5} + \frac{\alpha^7}{7} + \cdots}{\alpha + \frac{\alpha^3}{3} + \frac{\alpha^5}{5} + \frac{\alpha^7}{7} + \cdots}$$

For practical purposes, with $\alpha$ relatively small this reduces to $$D = \frac{\alpha_2}{3 + \alpha^2}$$

so that $$\alpha = \sqrt{\frac{3D}{1 - D}} \qquad (17)$$

Maximum current gains $\alpha$ for specified peak distortion D according to this analysis are listed below.

| *Peak percent distortion*: | *Maximum current gain* ($\alpha$) |
|---|---|
| 0.1 | 0.045 |
| 1.0 | 0.16 |
| 10.0 | 0.7 |

Hence, within limits of distortion approximately as outlined above, the output of the multiplier is $$e_0 = Kiv_a$$

and since current $i$ is assumed to be linearly dependent upon input signal $v_b$, the output signal is $$e_0 = K'v_a v_b$$

where K' is a constant dependent partly on the characteristics of transistors Q5 and Q6.

As an example, assume that signals $v_a$ and $v_b$ are sinusoidal in form and respectively are given by:

$$v_a = V_a \sin \omega_a t$$
$$v_b = V_b \sin \omega_b t$$

where $V_a$ and $V_b$ are the peak amplitudes of signals $v_a$ and $v_b$, and $\omega_a$ and $\omega_b$ are their angular frequencies. Then the output signal $e_0$ will be $$e_0 = K'V_a V_b \sin \omega_a t \sin \omega_b t$$

If for example $\omega_a$ represents a frequency of 10,000 c.p.s. and $\omega_b$ represents a frequency of 500 c.p.s., the output signal $e_0$ will contain components representative of the sum and difference frequencies, i.e., 9,500 c.p.s. and 10,500 c.p.s. If $\omega_a$ and $\omega_b$ each represent frequencies of (for example) 1000 c.p.s., the output signal $e_0$ will contain a 2000 c.p.s. component (the sum frequency) and a DC component (the difference frequency). It will be also observed that the peak amplitude of the output signal $e_0$ is proportional to the product of the peak amplitudes $V_a$ and $V_b$ of the input signals $v_a$ and $v_b$.

Of course the input signals $v_a$ and $v_b$ need not be sinusoidal; either such signal may be a square wave, a triangular wave, or some other waveform. Whatever the form of the input signals, an instantaneous product of the input signals is provided by the multiplier. Since, over the linear range of the multiplier, the output signal is substantially free of components representative of either individual input signal, but contains only components representative of this product, the need for output filter circuits is greatly reduced.

It will be noted that, in the circuit described, the collector currents of transistors Q5 and Q6 are substantially independent of variations in input signal $v_a$, being dependent substantially solely upon signal $v_b$. Similarly the sharing of currents between transistors Q1 and Q2, and Q3 and Q4, is substantially independent of current $i$, i.e., of signal $v_b$, being dependent substantially solely on signal $v_a$. Adjustments of the base-to-emitter voltages of these transistors occur automatically as dictated by signal $v_a$ and the current available to be shared.

Figures 4, 5:
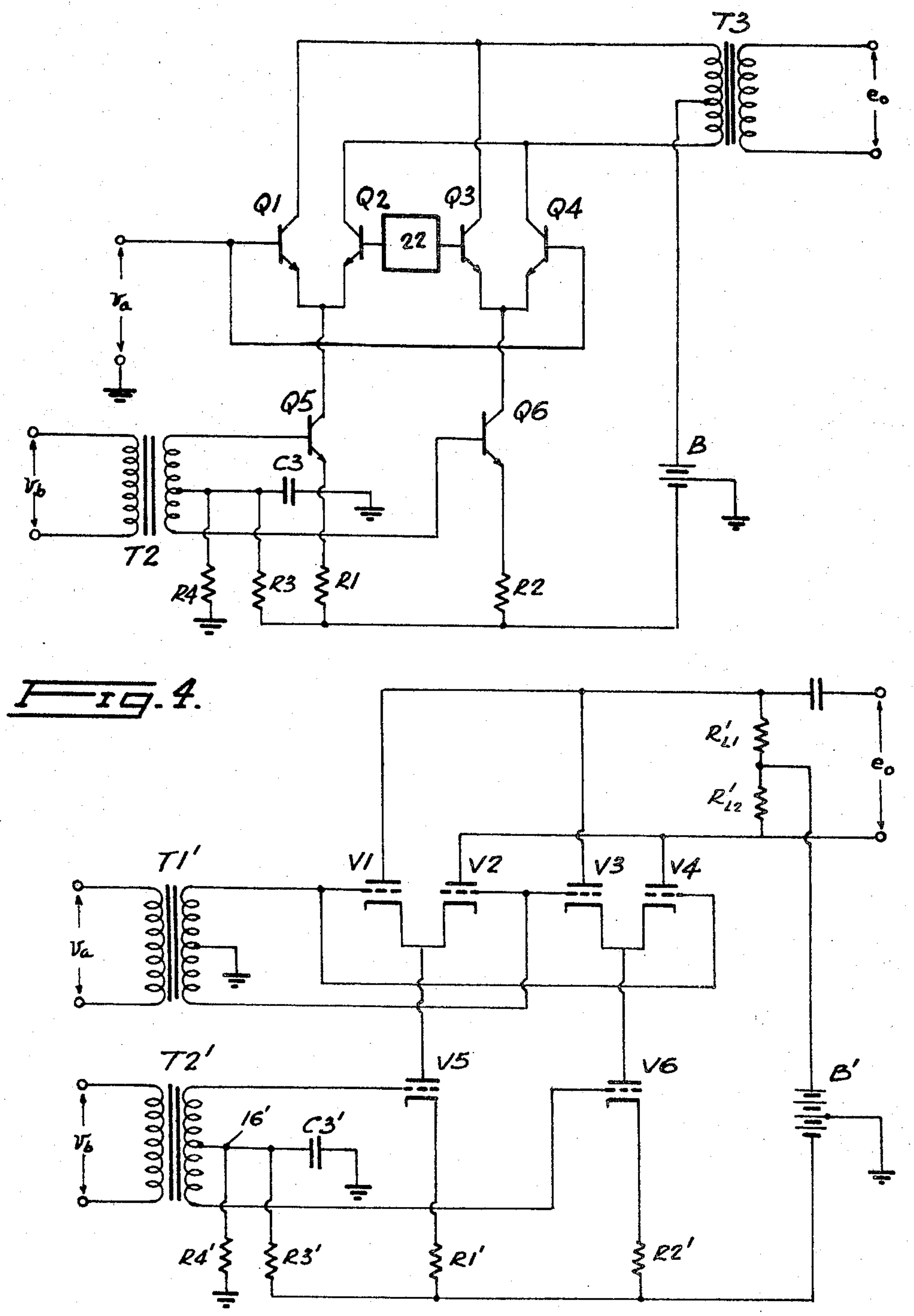
FIGURE 4 shows a modification of the circuit of FIGURE 1.
FIGURE 5 shows a circuit similar to the circuit of FIGURE 1 but employing vacuum tubes.

If desired the bases of transistors Q2 and Q3 may be held at a fixed bias and input $v_a$ may then be unbalanced, as shown in FIGURE 4. In FIGURE 4 the bases of transistors Q2 and Q3 are shown connected to a conventional low impedance bias network 22, network 22 providing a low impedance to ground. In this situation, where unbalance exists in input signal $v_a$, it is desirable that load resistors $R_{L1}$ and $R_{L2}$ be replaced by a centre-tapped output transformer T3, as shown, to reduce any effects of imbalance on the output signal $e_0$. An output transformer is also preferable in the FIGURE 1 circuit if signal $v_b$ is to be made of sufficient magnitude to cut off transistors Q5 and Q6 alternately during portions of each cycle. The tight coupling between the transformer halves reduces distortion in the output signal, as is well known in the art.

A circuit according to the invention may be constructed embodying tubes instead of transistors, such a tube circuit being shown in FIGURE 5. A set of four similar triodes V1 to V4 is provided (with substantially identical operating characteristics), triodes V1 and V2 having their cathodes connected together and to the plate of another triode V5, and triodes V3 and V4 having their cathodes connected together and to the plate of another triode V6. The cathodes of triodes V5 and V6 are connected through cathode resistors R1' and R2' respectively to the negative terminal of centre grounded source B', resistors R1' and R2' having sufficiently high resistance that triodes V5 and V6 act as current generators. The positive terminal of source B' is connected to the common point of a pair of series connected load resistors $R_{L1}'$ and $R_{L2}'$, the other terminal of resistor $R_{L1}'$ being connected to the plates of triodes V1 and V3, the other terminal of resistor $R_{L2}'$ being connected to the plates of triodes V2 and V4. Input signal $v_a$ is applied to the grids of triodes V1 to V4 through transformer T1', having a centre grounded secondary coil as shown. Input signal $v_b$ is applied to the grids of triodes V5 and V6 through transformer T2', the secondary winding of transformer T5 having a centre tap 16' connected to a voltage divider biasing network consisting of resistors R3' connected to the negative terminal of source B' and R4' connected to ground. Capacitor C3' holds tap 16' at AC ground potential.

The operation of the tube circuit is similar to that of the transistor circuit, and the same partial qualitative analysis may be performed, substituting the term "plate current" for the term "collector current" as used in the previous discussion. Again the output signal $e_o$ is essentially a junction of the product only of the two input signals $v_a$ and $v_b$, and contains substantially no components representative of either input signal alone. Again, signal $v_a$ may be unbalanced, if desired, by connecting the grids of triodes V2 and V3 to a fixed bias network in a manner similar to the circuit of FIGURE 4, although such bias network need not be of low impedance, since tubes (unlike transistors) are relatively high input impedance devices.

It will be realized that pentodes may be employed instead of triodes V5 and V6, and indeed even a higher output impedance may be realized than with triodes. It will further be realized that triodes V5 and V6 (or transistors Q5 and Q6) are merely a way of converting one of the voltage signals to be multiplied into a current signal. If signal $v_b$ were initially supplied in current form, e.g., from a measuring instrument, then no such conversion would be necessary, although the current representative of signal $v_b$ would still have to be split into opposite phase components, one component being supplied to each of the pairs of triodes (or transistors).

In addition it will be apparent that other suitable devices, such as field effect devices, may be employed in place of the ordinary transistors or vacuum tubes shown.

I claim:

1. A signal multiplier for multiplying a first signal comprising first and second currents of substantally equal magnitude and opposite sign by a second signal, said multiplier comprising (a) first, second, third and fourth similar control signal responsive devices each having control signal input means, current input means, and current output means,
(b) means for applying said first current to the current input means of said first and second devices,
(c) means for applying said second current to the current input means of said third and fourth devices,
(d) means coupling together the control signal input means of said first and fourth devices,
(e) means coupling together the control signal input means of said second and third devices,
(f) means for applying said second signal between said means (d) and (e),
(g) means biasing said first and second devices to share said first current in a ratio varying substantially exponentially with said second signal,
(h) means biasing said fourth and third devices to share said second current in said ratio,
(i) means coupling together the current output means of said first and third devices for the current thereof to add as a first load current.
(j) means coupling together the current output means of said second and fourth devices for the currents thereof to add as a second load current,
(k) and means for generating an output signal proportional to the difference between said load currents.

2. A signal multiplier for multiplying a first alternating electrical signal by a second alternating electrical signal of the type comprising alternating currents $i$ and $-i$ of substantially equal magnitude and opposite sign, each of said currents $i$ and $-i$ being superimposed respectively on separate direct currents I to form first and second currents $i+I$ and $-i+I$ respectively, said multiplier comprising (a) first, second, third and fourth similar transistors each having emitter, base, and collector electrodes,
(b) means for applying said first currents to the emitter electrodes of said first and second transistors,
(c) means for applying said second current to the emitter electrodes of said third and fourth transistors,
(d) means coupling together the base electrodes of said first and fourth transistors,
(e) means coupling together the base electrodes of said second and third transistors,
(f) means for applying said first signal between said means (d) and (e),
(g) means biasing said first and second transistors to share said first current in a ratio varying substantially exponentially with the instantaneous value of said first signal,
(h) means biasing said fourth and third transistors to share said second current in said ratio,
(i) first load impedance means coupled to the collector electrodes of said first and third transistors for the collector currents thereof to add in said load means as a first load current,
(j) second load impedance means equal in impedance to said first load means and coupled to the collector electrodes of said second and fourth transistors for the collector currents thereof to add as a second load current,
(k) means connecting said load means in series,
(l) and output means connected across both said load means for deriving an output signal therefrom proportional to the difference between said load currents.

3. A signal multiplier for multiplying a first alternating electrical signal by a second alternating electrical signal of the type comprising alternating currents $i$ and $-i$ of substantially equal magnitude and opposite sign, each of said currents $i$ and $-i$ being superimposed respectively on separate direct currents I to form first and second currents $i+I$ and $-i+I$ respectively, said multiplier comprising:

(a) first, second, third and fourth similar vacuum tubes each having a cathode, a control grid, and a plate,
(b) means for applying said first current to the cathodes of said first and second tubes,
(c) means for applying said second current to the cathodes of said third and fourth tubes,
(d) means coupling together said grids of said first and fourth tubes,
(e) means coupling together said grids of said second and third tubes,
(f) means for applying said first signal between said means (d) and (e),
(g) means biasing said first and second tubes to share said first current in a ratio varying substantially exponentially with the instantaneous value of said first signal,
(h) means biasing said fourth and third tubes to share said second current in said ratio,
(i) first load impedance means coupled to the plates of said first and third tubes for the plate currents thereof to add in said load means as a first load current,
(j) second load impedance means equal in impedance to said first load means and coupled to the plates of said second and fourth tubes for the plate currents thereof to add as a second load current,
(k) means connecting said load means in series,
(l) and output means connected across both said load means for deriving an output signal therefrom proportional to the difference between said load currents.

4. A multiplier as claimed in claim 3 wherein said first, second, third and fourth tubes are all triodes.

5. A signal multiplier comprising:

(a) first, second, third and fourth similar control signal responsive devices each having control signal input means, current input means, and current output means, (b) first and second similar current generating means each having control signal input means, current input means, and current output means, and each for generating a current linearly proportional to a signal applied to the control signal input means thereof, (c) means coupling the current output means of said first current generating means to the current input means of both said first and second devices, (d) means coupling the current output means of said second current generating means to the current input means of both said third and fourth devices, (e) first and second equal impedance means connected together in series at a junction point, (f) means coupling the current output means of both said first and third devices through the series connection of said impedance means to the current output means of both said second and fourth devices, (g) means for coupling said junction point to the current input means of both said current generator means, (h) means coupling together the control signal input means of said first and fourth devices, (i) means coupling together the control signal input means of said second and third devices, (j) means for applying a first signal to be multiplied between said means (h) and (i), (k) means for applying a second signal to be multiplied between the respective control signal input means of said first and second current generating means, (l) and means for deriving an output signal across said series connection of said impedance means.

6. A multiplier according to claim 5 wherein said control signal responsive devices and said current generating means are transistors.

7. A multiplier according to claim 5 wherein said control signal responsive devices and said current generating means are vacuum tubes.

8. A multiplier according to claim 5 wherein said control signal responsive devices are transistors and said current generating means are vacuum tubes.

9. A multiplier according to claim 5 wherein said control signal responsive devices are vacuum tubes and said current generating means are transistors.

10. A multiplier according to claim 6 wherein said means (k) includes (1) biasing means for biasing said first and second current generating means at a common bias potential selected in a substantially linear operating range of said current generating devices, and (2) means for balancing said second signal about said bias potential.

11. A multiplier according to claim 10 wherein said means (h) and (i) together include (1) biasing means for biasing each of said control signal responsive devices at a common bias potential selected in a substantially exponential operating range of said devices, and (2) means for balancing said first signal about said bias potential.

12. A signal multiplier for multiplying first and second alternating electrical signals, said multiplier comprising:

(a) first, second, third and fourth similar transistors each having emitter, base and collector electrodes, (b) first and second current generating means including fifth and sixth similar transistors respectively, each of said fifth and sixth transistors having impedance means coupled to the emitter thereof to provide a high output impedance for each of said current generating means, (c) means connecting the emitters of said first and second transistors together and to the collector of said fifth transistor, (d) means connecting the emitters of said third and fourth transistors together and to the collector of said sixth transistor, (e) first and second equal impedance means connected together in series at a junction point, (f) means coupling the collectors of both said first and third transistors through the series connection of said first and second impedance means to the collectors of said second and fourth transistors, (g) means for coupling said juncton point to the emitters of both said fifth and sixth transistors, (h) means coupling together the bases of said first and fourth transistors, (i) means coupling together the bases of said second and third transistors, (j) means for applying said first signal between said means (h) and (i), (k) means biasing said first and second transistors to share collector current of said fifth transistor in a ratio varying substantially exponentially with the instantaneous value of said first signal, (l) means biasing said fourth and third transistors to share collector current of said sixth transistor in said ratio, (m) and means for applying said second signal between the bases of said fifth and sixth transistors including (i) means for biasing said fifth and sixth transistors at a common potential selected in a substantially linear operating range of said fifth and sixth transistors, and (ii) means for balancing said second signal about said potential.

13. A signal multiplier for multiplying first and second alternating electrical signals, said multiplier comprising (a) first, second, third and fourth similar vacuum tubes each having a cathode, a control grid, and a plate, (b) first and second current generating means including fifth and sixth vacuum tubes respectively, each of said fifth and sixth tubes having impedance means coupled to the cathode thereof to provide a high output impedance for each of said current generating means, (c) means connecting the cathodes of said first and second tubes together and to the plate of said fifth tube, (d) means connecting the cathodes of said third and fourth tubes together and to the plate of said sixth tube, (e) first and second equal impedance means connected together in series at a junction point, (f) means coupling the plates of said first and third tubes through the series connection of said first and second impedance means to the plates of said second and fourth tubes, (g) means for coupling said junction point to the cathodes of said fifth and sixth tubes, (h) means coupling together said grids of said first and fourth tubes, (i) means coupling together said grids of said second and third tubes, (j) means for applying said first signal between said means (h) and (i), (k) means biasing said first and second tubes to share plate current of said fifth tube in a ratio varying substantially exponentially with the instantaneous value of said first signal, (l) means biasing said fourth and third tubes to share plate current of said sixth tube in said ratio, (m) and means for applying said second signal between said grids of said fifth and sixth tubes including (i) means for biasing said fifth and sixth tubes at a common potential selected in a substantially linear operating range of said fifth and sixth tubes, and (ii) means for balancing said second signal about said potential.

14. A multiplier as claimed in claim 13 wherein said first, second, third and fourth tubes are triodes.

References Cited

UNITED STATES PATENTS

| | | | |
|---|---|---|---|
| 3,197,626 | 7/1965 | Platzer | 235—196 X |
| 3,344,263 | 9/1967 | Gere et al. | 235—196 |

MALCOLM A. MORRISON, *Primary Examiner.*

J. RUGGIERO, *Assistant Examiner.*

U.S. Cl. X.R.

328—160; 307—229